July 3, 1951 F. O. SEIGNEUR 2,559,548
LATCHABLE SEAT
Filed March 2, 1946 2 Sheets-Sheet 1
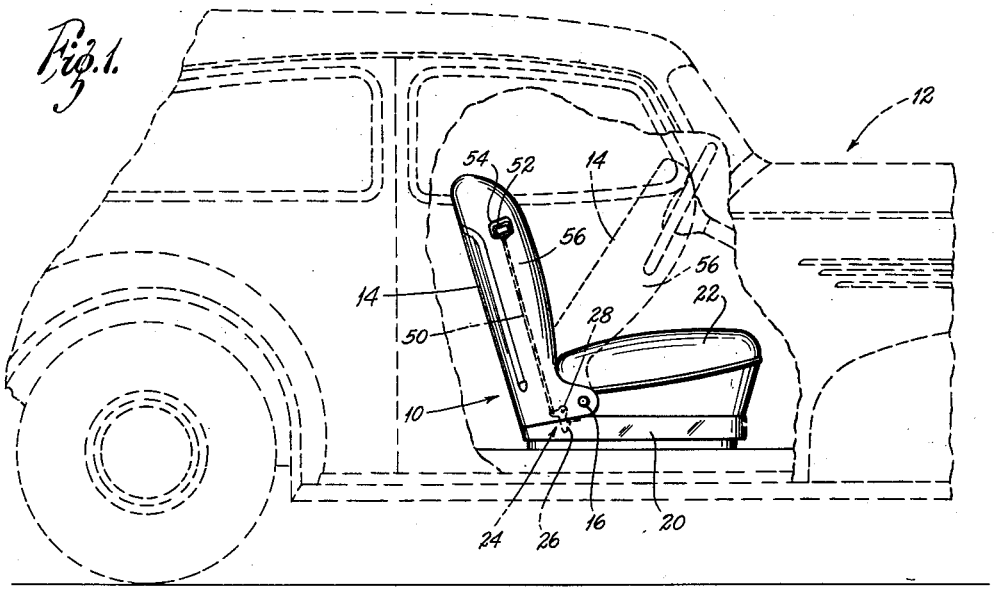
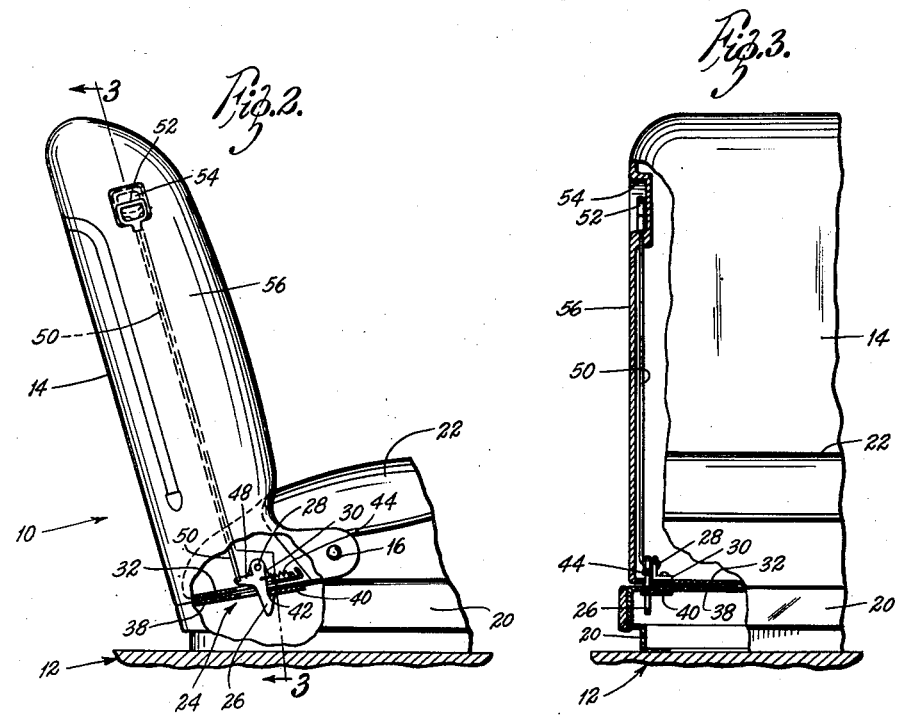
INVENTOR:
FLOYD O. SEIGNEUR,
BY Kingsland, Rogers & Ezell
ATTORNEYS.

July 3, 1951
F. O. SEIGNEUR
2,559,548
LATCHABLE SEAT
Filed March 2, 1946
2 Sheets-Sheet 2
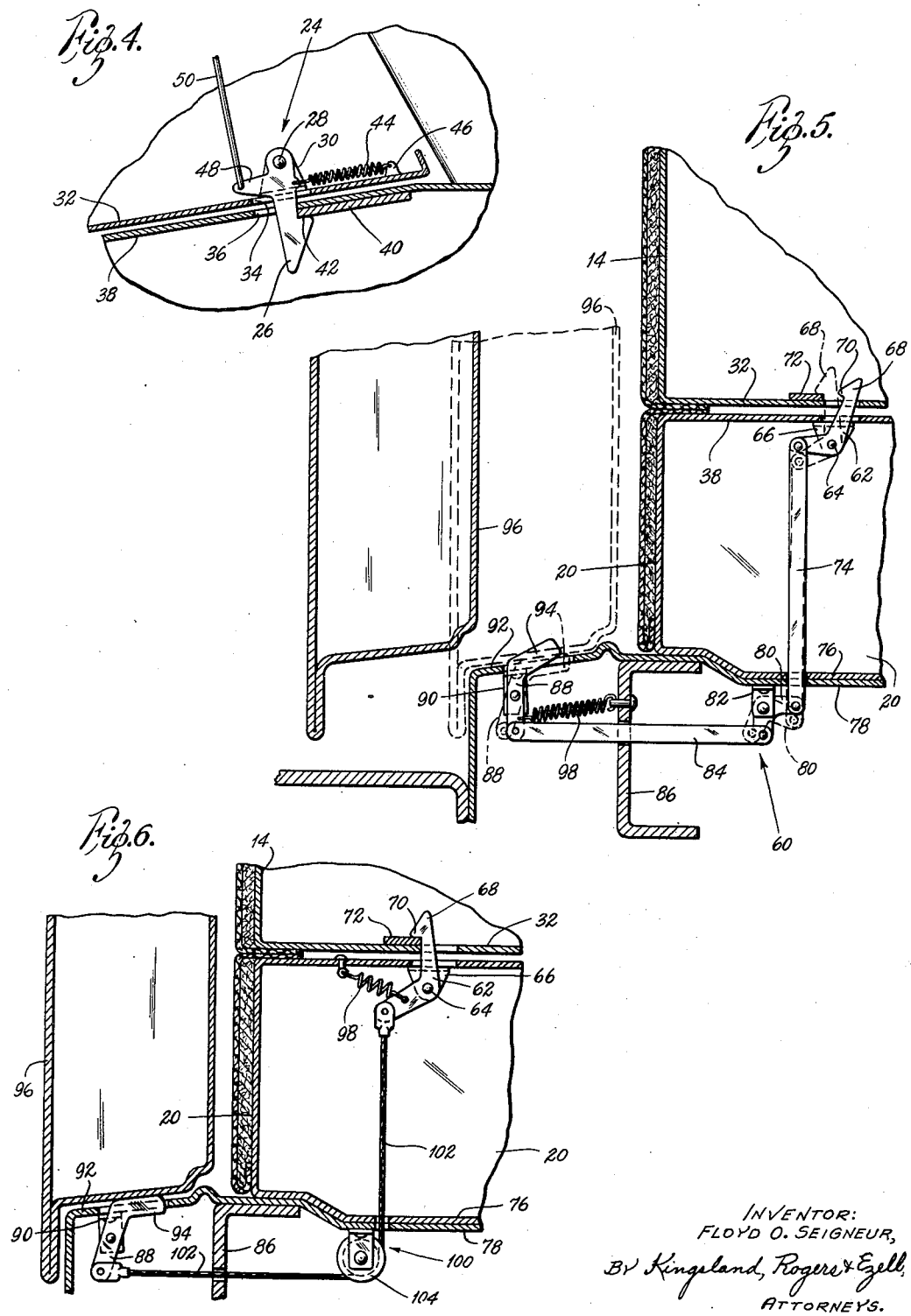
INVENTOR:
FLOYD O. SEIGNEUR,
By Kingsland, Rogers & Ezell
ATTORNEYS.

Patented July 3, 1951

2,559,548

UNITED STATES PATENT OFFICE 2,559,548

LATCHABLE SEAT

Floyd O. Seigneur, St. Louis, Mo.

Application March 2, 1946, Serial No. 651,445

2 Claims. (Cl. 155—5)

The present invention relates generally to seating constructions, and more particularly to a releasably locked folding back automobile seat, or the like, the back of which is locked in upright position during occupancy of the seat, particularly when the vehicle is in motion.

Automobiles of the coach type, which have only a single door on each side affording entry to both the front and the rear seats, have front seats with backs which fold forwardly to permit a person to enter or leave the vehicle. Such seat backs are maintained in upright or slightly rearwardly inclining position through gravity. Heretofore, no means has been provided for maintaining the folding back in a secure position while the vehicle is in motion. Numerous accidents, involving serious injuries to the right-hand front seat occupant of coach type vehicles, have resulted from the occupant of the seat being thrown forwardly against the dashboard or windshield from the forward movement of the seat back occasioned by a quick stop of the vehicle. The same situation obtains in respect to certain types of aeroplanes and other passenger transporting vehicles.

Therefore, an object of the present invention is to provide a novel folding back seat construction for vehicles in which means is incorporated for locking the folding back against forward movement when the vehicle is in motion, or is prepared for motion.

Another object is to provide a novel folding back vehicle seat construction incorporating releasable locking mechanism adapted to insure the safety of an occupant against sudden stops of the vehicle.

Another object is to provide a novel folding back seat construction incorporating automatic locking and unlocking features, and so constructed that the folding back is secured against forward folding movement when an adjacent door is closed and which is free to fold forwardly when the door is open.

Another object is to provide a novel releasable locking mechanism for folding back seats of vehicles which is adapted to prevent a folding back seat from flying forwardly upon sudden stopping of the vehicle.

Other objects are to provide a novel folding back seat construction incorporating novel locking mechanism which is sturdy, which is readily fabricated, and which lends itself to practical vehicle installation.

Other objects and advantages, in addition to the foregoing, will appear from the following description taken with the accompanying drawings, in which:

Fig. 1 is a side elevational view of a latchable folding back seat construction embodying teachings of the present invention, an automobile of the coach type being dotted in to show the disposition of the present seat construction in respect thereto;

Fig. 2 is an enlarged side elevational view, partly in section, showing details of the locking mechanism embodied in the seat construction in Fig. 1;

Fig. 3 is an enlarged front elevational view of the seat construction, partially in section and with parts broken away, illustrating further details of the locking mechanism;

Fig. 4 is an enlarged fragmentary vertical sectional view of a portion of the locking mechanism;

Fig. 5 is an enlarged vertical transverse cross-sectional view through a portion of a folding seat construction and a supporting vehicle incorporating a modified locking mechanism, the door of the vehicle being open and the locking mechanism in released position; and Fig. 6 is a view similar to Fig. 5, but showing a still further modified locking mechanism, the door of the vehicle being closed and the locking mechanism in locked position.

Referring to the drawings more particularly by reference numerals, 10 indicates generally a folding back seat shown mounted in an automobile 12 of the coach type. The seat 10 includes a folding back 14 pivotally connected at 16 to a bracket (not shown) mounted on a base 20, which supports a seat cushion 22. A locking mechanism 24 is mounted on the folding back 14 and includes a latching member 26 pivotally mounted on a stud 28 supported by a bracket 30 mounted on the bottom wall 32 of the folding back 14. The latching member 26 extends through an opening 34 in the bottom wall 32 and through an opening 36 in the top wall 38 of the base 20 to engage a plate member 40 by means of a shoulder 42, when in locking position, being biased to locking position by a tension spring 44 connected at one end of the latching member 26 and at the other end to a lug 46. The latching member 26 also includes an extension arm 48 to which is pivotally connected a rod 50, to the upper end of which is connected a handle 52. The rod 50 is disposed interiorly of the folding back 14, as is clearly shown in Fig. 3, the handle 52 being disposed in a recess 54 formed in the end wall 56 of the folding back 14.

It is manifest that upward movement of the rod 50, effected by lifting the handle 52 with the hand, pivots the latching member 26 clockwise to release the shoulder 42 from the plate 40, which will permit forward folding of the back 14. The latching member 26 is formed so that it will readily return through the openings 34 and 36 when the back 14 is returned to normal seating position. Since the spring 44 biases the latching member 26 into locking position, the back 14 will remain securely locked at all times and cannot accidentally fold forwardly.

In Fig. 5 is a modified locking mechanism 60, which is automatic in operation. The modified locking mechanism 60 includes a bell crank 62 pivotally mounted by a stud 64 on a bracket 66 secured to the top wall 38 of the base 20. One end of the bell crank 62 is in the form of a latching member 68, which extends through suitable openings in the top wall 38 and in the bottom wall 32 of the folding back 14. The latching member 68 includes a shoulder 70 which cooperates with a plate 72 to latch the back 14 to the base 20. The other end of the bell crank 62 is pivotally connected to a link 74, which extends through suitable openings in the bottom wall 76 of the base 20 and in the floor 78 of the automobile 12. The lower end of the link 74 is pivotally connected to a bell crank 80 pivotally supported on a bracket 82 secured to and beneath the automobile floor 78. The other end of the bell crank 80 is pivotally connected to a link 84, which extends through an opening in the longitudinal channel member 86 of the automobile 12, and is pivotally connected at its other end to a bell crank 88, which is pivotally supported by a bracket 90 secured to an extension 92 of the automobile floor 78. The free end of the bell crank 88 is in the form of a trigger 94, which extends through a slot in the extension 92 to the position shown in Fig. 5 in full lines when the door 96 of the automobile 12 is open, being biased to such position by a tension spring 98, which is connected at one end to the bell crank 88 and at the other end to the channel member 86.

In Fig. 5, the locking position of the locking mechanism 60 is shown in dotted lines. When the door 96 is closed, the trigger 94 is depressed, which pivots the several bell cranks and levers, in a manner obvious from an inspection of the drawing, to bring the latch member 68 into engagement with the plate 72.

In Fig. 6 is a still further modified locking mechanism 100, which is similar to the locking mechanism 60 of Fig. 5, differing in the employment of a cable 102 and guide pulley 104 instead of the links 74 and 84 and the bell crank 80 of the locking mechanism 60, and in the location of the spring 98. Since the other parts of the locking mechanism 100 and the associated elements are the same as those employed with the locking mechanism 60, the same reference numerals are employed. The cable 102 may be encased in a metal conduit suitably anchored, if desired.

It is manifest that the locking mechanism 100 functions in the same manner as the locking mechanism 60, being a positive securing means to prevent forward folding of the back 14 when in locking position.

It is apparent that there has been provided a novel folding back seat construction incorporating a locking mechanism whereby accidental folding of the seat back is prevented, and that all of the objects and advantages sought for such construction have been achieved.

It is to be understood that the foregoing description and the accompanying drawings have been given by way of illustration and example. Modifications including changes in configuration of elements and rearrangement of parts and the substitution of equivalent elements will be apparent to those skilled in the art, and such modifications and substitutions are contemplated as within the scope of the present invention, which is limited only by the claims which follow.

What is claimed is:

1. In combination with a vehicle including a seat having a forwardly folding back and a vehicle door adjacent one side of said seat, a releasable locking mechanism mounted on said vehicle including a movable latch member mounted on said vehicle, and engageable with said seat back in one position of movement to maintain said seat back against forward folding movement, a movable door actuatable member mounted on said vehicle for engagement and movement by said door when closed, a link pivotally connected at one end to said latch member, a second link pivotally connected at one end to said door actuatable member, a bellcrank pivotally mounted on said vehicle, both of said links being pivotally connected at their other ends to said bellcrank, and spring means both biasing said door actuatable member into position for engagement by said door and said latch member into a second position of movement out of engagement with said seat back permitting forward folding movement thereof, so that closing of said door effects locking of said seat back against forward folding when said seat back is in normal position as said door is closed and opening of said door permits said spring means to release said seat back.

2. In combination with a vehicle including a seat having a forwardly folding back and a vehicle door adjacent one side of said seat, a releasable locking mechanism mounted on said vehicle including a movable latch member mounted on said vehicle and engageable with said seat back in one position of movement to maintain said seat back against forward folding movement, a movable door actuatable member mounted on said vehicle for engagement and movement by said door when closed, means connecting said movable latch member and said movable door actuatable member for positive movement of the former into latching position upon actuated movement of the latter, and spring means both biasing said door actuatable member into position for engagement by said door and said latch member into a second position of movement out of engagement with said seat back permitting forward folding movement thereof, so that closing of said door effects locking of said seat back against forward folding when said seat back is in normal position as said door is closed and opening of said door permits said spring means to release said seat back.

FLOYD O. SEIGNEUR.

REFERENCES CITED

The following references are of record in the file of this patent:

UNITED STATES PATENTS

| Number | Name | Date |
|---|---|---|
| 1,942,070 | Smelker | Jan. 2, 1934 |
| 2,120,156 | Simpson | June 7, 1938 |
| 2,189,396 | Greig | Feb. 6, 1940 |
| 2,428,217 | Hedley et al. | Sept. 30, 1947 |

FOREIGN PATENTS

| Number | Country | Date |
|---|---|---|
| 384,641 | Great Britain | Mar. 2, 1931 |